No. 796,745. PATENTED AUG. 8, 1905.
H. E. MAROT.
GRAIN SORTER.
APPLICATION FILED JAN. 12, 1905.
3 SHEETS—SHEET 1.
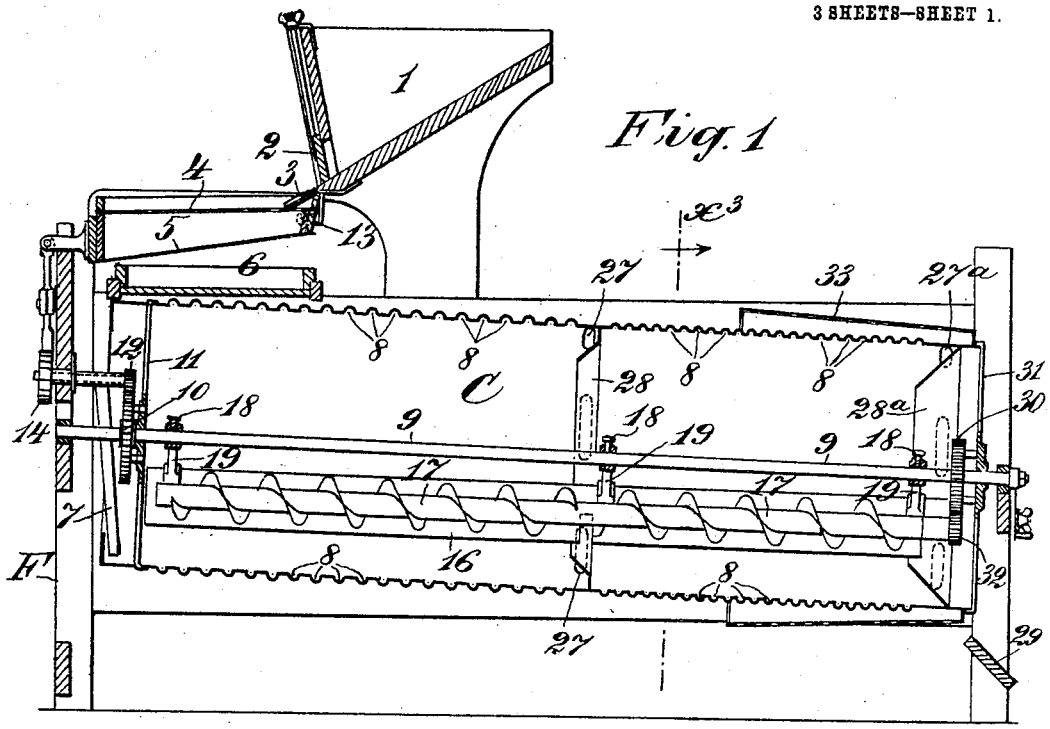
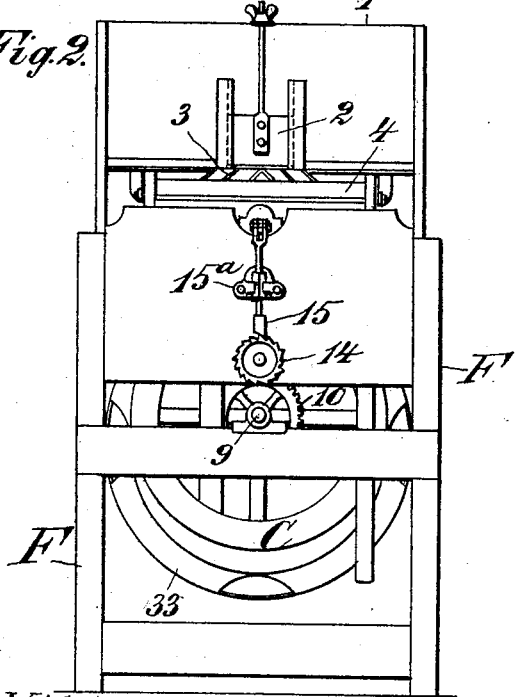
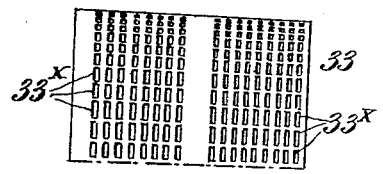
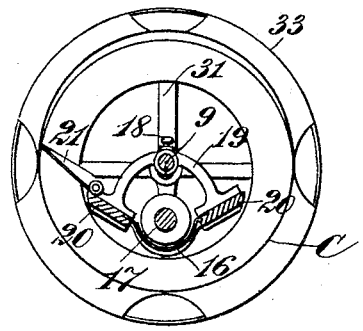
Witnesses:
F. H. Himau
William J. Firth
Inventor:
Hilaire Emile Marot
by Henry Connett
Attorney No. 796,745. PATENTED AUG. 8, 1905.
H. E. MAROT.
GRAIN SORTER.
APPLICATION FILED JAN. 12, 1905.

3 SHEETS—SHEET 2.

Witnesses: Inventor:

No. 796,745. PATENTED AUG. 8, 1905.
H. E. MAROT.
GRAIN SORTER.
APPLICATION FILED JAN. 12, 1905.
3 SHEETS—SHEET 3.
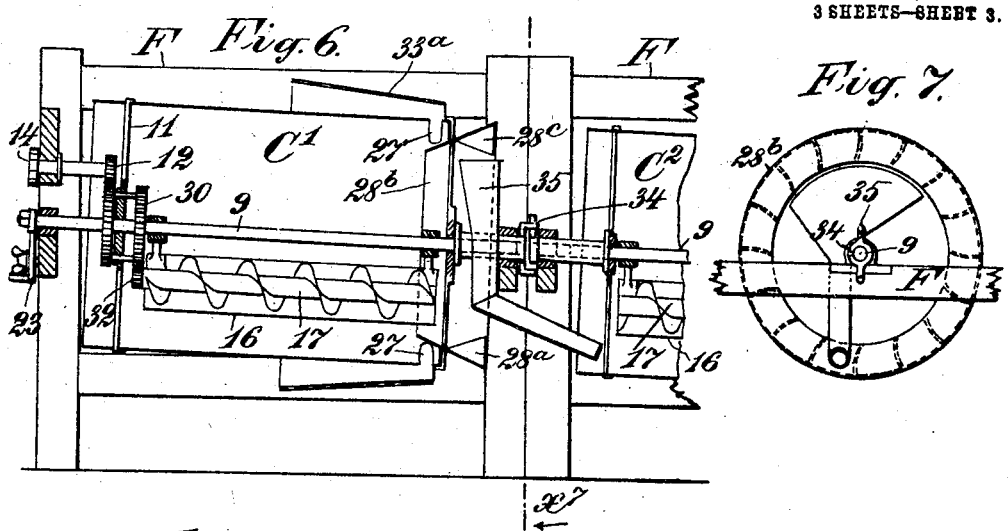
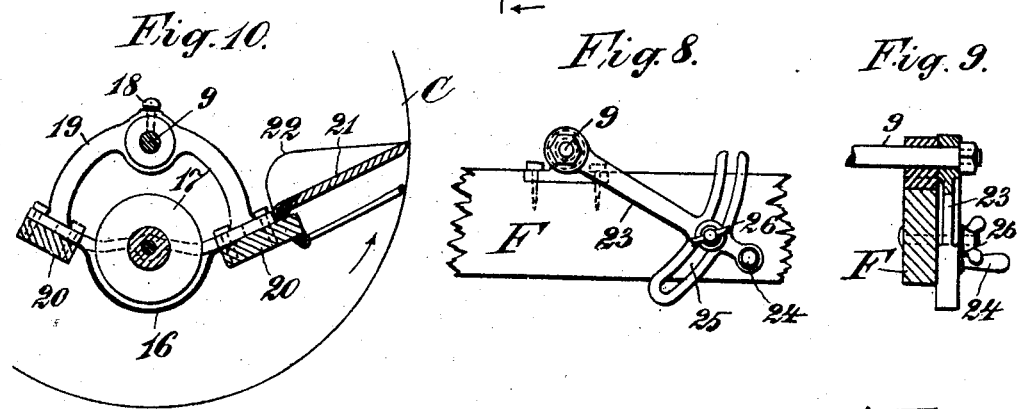
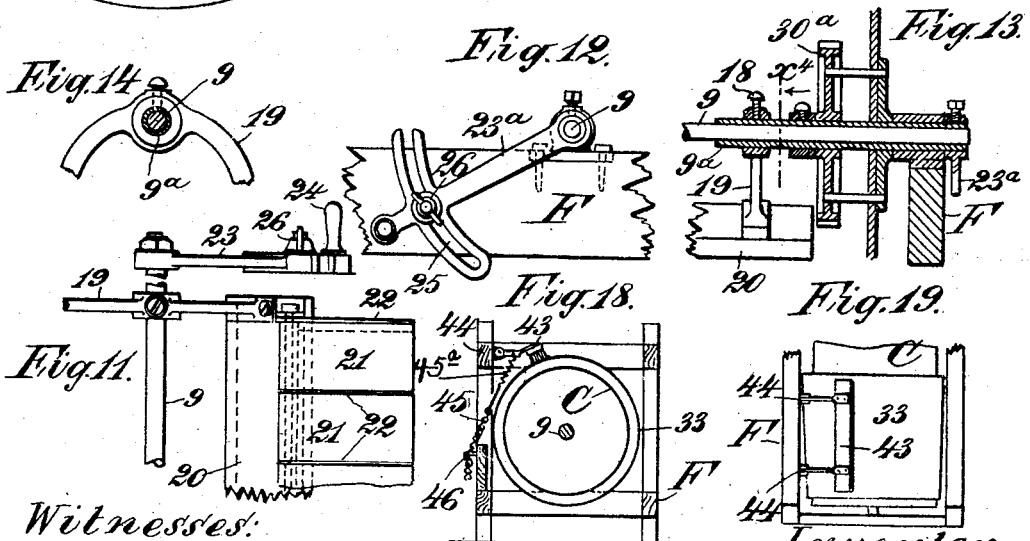
Witnesses:
Inventor:
Hilaire Emile Marot
by Henry Cayman
Attorney

UNITED STATES PATENT OFFICE.

HILAIRE EMILE MAROT, OF NIORT, FRANCE.

GRAIN-SORTER.

No. 796,745.　　　　Specification of Letters Patent.　　　　Patented Aug. 8, 1905.

Application filed January 12, 1905. Serial No. 240,771.

*To all whom it may concern:*

Be it known that I, HILAIRE EMILE MAROT, a citizen of the French Republic, residing at Niort, Deux-Sèvres, France, have invented certain new and useful Improvements in Grain-Sorters, of which the following is a specification.

This invention relates to the class of celled or pocketed sorters which serve to separate grains of all kinds according to shape and size, such as wheat and other cereals, from foreign seeds or granular substances. These apparatuses, as is well known, have each a cylinder to which constant axial rotation is imparted, the cylinder having formed in its inner face pits or cells. The grain is fed into the cylinder, and those that are round and short enough fall into the said pits or cells and lodge there, while the longer grains, such as those of wheat, are not engaged by the cells and gradually work their way through the inclined cylinder to the delivery.

The present invention resides in certain combinations of parts and novel features of construction, which will be fully described hereinafter with reference to the accompanying drawings and will be carefully defined in the claims.

Figure 4:
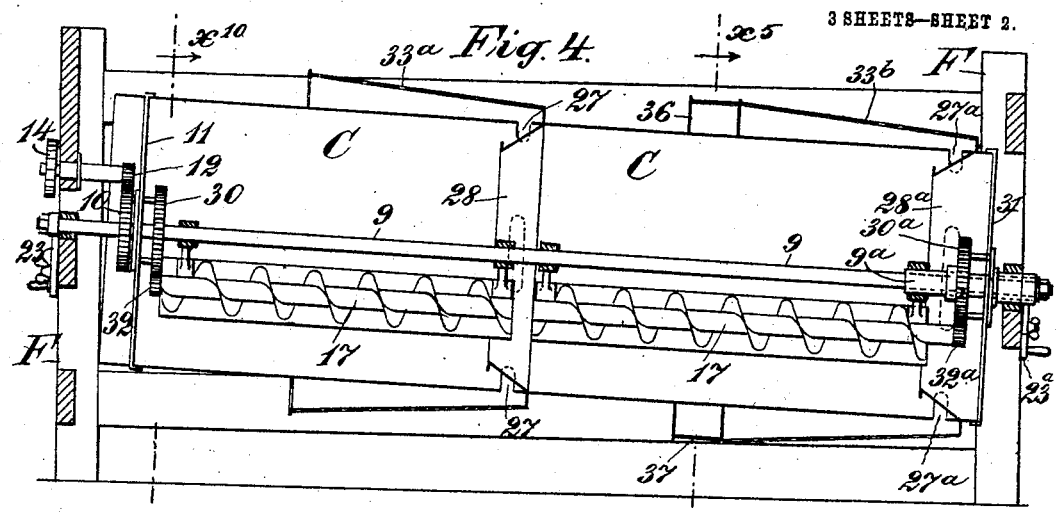
Figures 5, 15, 16:
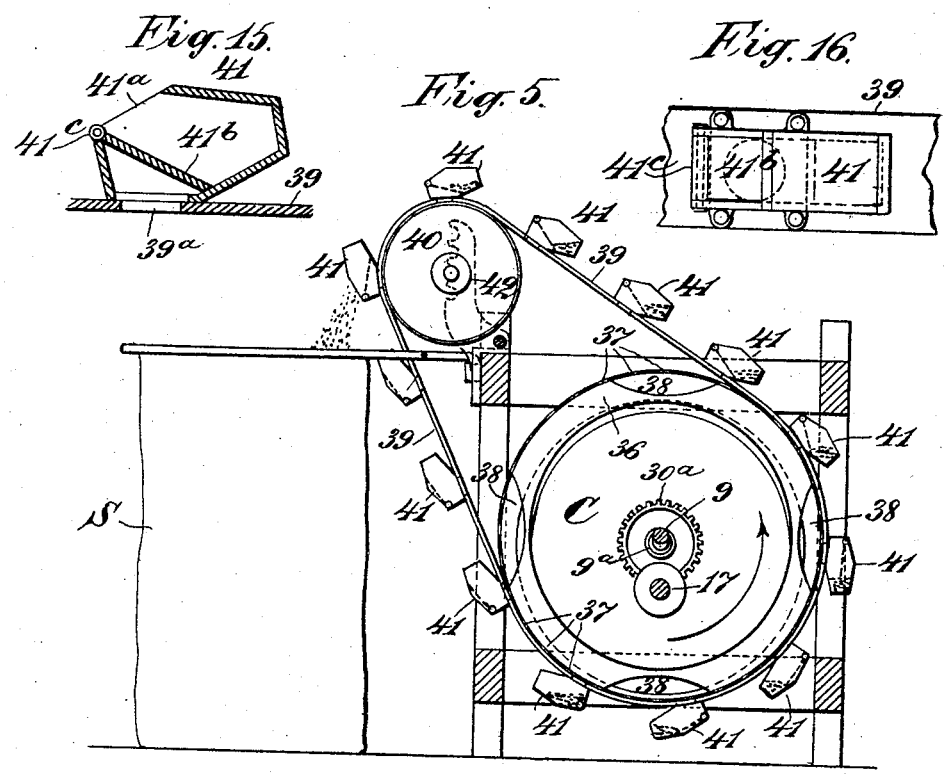
Figure 20:
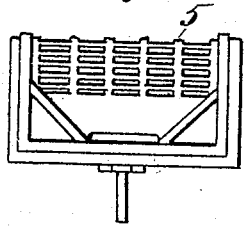

In the said drawings, which illustrate an embodiment of the invention, Figure 1 is a longitudinal vertical axial section of one form of the apparatus. Fig. 2 is an end view as seen from the left in Fig. 1. Fig. 3 is a transverse section at $x^3$ in Fig. 1. Fig. 4 is a longitudinal vertical axial section of a form of the apparatus in two divisions and having two separate driving means. Fig. 5 is a transverse section at line $x^5$ in Fig. 4. This view shows the automatic bagging mechanism. Fig. 6 is a sectional view showing the apparatus constructed in two distinct parts, and Fig. 7 is an end view looking from right to left at line $x^7$ in Fig. 6 and illustrating the means of communication between the parts of the apparatus as seen in side elevation in Fig. 6. Figs. 8 and 9 are detail views of the regulating-lever. Fig. 10 is a section at line $x^{10}$ in Fig. 4, but on a larger scale, showing a detail of the regulator. Fig. 11 is a plan of the parts seen in sectional elevation in Fig. 10. Figs. 12 and 13 are detail views of the second regulator, to be more particularly described hereinafter; and Fig. 14 is a section at $x^{14}$ in Fig. 13. Figs. 15 and 16 are respectively a section and a plan of a cup of the automatic bagging device. Fig. 17 shows a fragment of the conical separator. Figs. 18 and 19 are respectively a side view of a brush, which bears on the conical screen. Fig. 20 is a plan view of a part of the screen 5 of the shaking-screen.

The views are mainly somewhat diagrammatic.

Referring especially to Figs. 1, 2, and 3, 1 is a hopper, the outlet of which is provided with a regulating-slide 2. The grain flowing from the hopper is distributed by a channeled distributing-plate 3 onto a shaking screening device comprising a coarse upper screen 4 for separating straw, &c., from the grain and a lower fine screen 5, through which dust and fine particles pass and fall into a suitable receptacle 6. The grain freed from straws, dust, &c., flows from the lower end of the inclined screen 5 into a chute 7, which leads it into the open end of a cylinder C, which is provided on its inner face with cells, pits, or indentations—8 in Fig. 1. This cylinder may be of sheet metal and the cells or pits be formed by means of a hemispherical punch, for example. The cylinder is rotatively mounted on a shaft 9, which is inclined and is supported at its ends in a suitable main frame F. Any means may be employed to rotate the cylinder on the shaft 9. That shown herein consists of a toothed wheel 10, rotatable on the shaft 9 and connected to a transverse bar 11 in the cylinder. This wheel 10 gears with a pinion 12, which may be driven from any source of power by any suitable means. The shaking screening device is hinged at 13 and may be shaken by any convenient mechanism. That shown herein consists of a ratchet-wheel 14 on the same shaft with the pinion 13 and adapted to actuate a pawl 15, which plays in a suitable guide $15^a$ on the frame and is coupled at its upper end to the outer end of the screening device.

The grain from the chute 7 falls directly on the inner surface of the cylinder C, and the elongated grains, such as those of wheat, &c., do not catch in the small somewhat hemispherical concavities or cells 8 and gradually work their way down toward the lower end of the cylinder, while the smaller, shorter, and rounder seeds and the like which are to be separated from the grain are caught in the cells and carried up as the cylinder rotates to be separated ultimately and removed by means now to be described.

Extending through the cylinder longitudinally is a trough 16, in which rotates an endless screw conveyer 17. This device is carried by the shaft 9, through means seen best, perhaps, in Figs. 3, 10, and 14. On the shaft are secured each by a set-screw 18 suitable cast-metal frames 19, to which are secured longitudinally-extending bars of wood 20, which clamp the margins of the trough 16 fast to the frames 19. At one side of the trough 16 and at the side where the cylinder is moving upward (see arrow in Fig. 10) there is hinged to the bar 20 at that side an inclined chute or chutes 21, which extends longitudinally of the cylinder and has suitable crosspartitions 22 to partition the chute and prevent the seeds and the like separated from the grain by the cells 8 and carried up to the said chute 21 from falling off at the ends of the latter and to compel them to pass down the incline of the chute into the trough 16.

The shaft 9 has secured on it at its end a lever 23, Figs. 8, 9, and 11, which is provided with a handle 24 and a curved slot 25. This slot is concentric with the shaft 9 and is engaged by a bolt in the frame, provided with a nut 26, whereby the lever may be secured at any point where it is set. This device constitutes a regulator whereby the shaft 9 may be displaced angularly or partly turned about its axis, so as to move the edge of the chute 21 which is adjacent to the cylinder up or down, and by this adjustment regulate the better the sorting of the grain.

In effect to provide that the cells in the cylinder shall contain no other than grain or seeds which are to be eliminated the chute 21 should be placed in such a manner that the outer end thereof, which bears on the inner surface of the cylinder C, may be at such a height that the grains which are not to be eliminated shall already have fallen back into the cylinder from the cells should they be carried up thereby. It will then be seen that the height of the chute may be varied to suit the particular mixture of grain in the apparatus and the result it is desired to obtain.

The cells or pits in the cylinder C are not of the same size throughout, as clearly seen in Fig. 1, those in the higher or receiving section being larger than those in the lower section, and at a point about midway of the length of the cylinder, where the larger cells end and the smaller begin, there is a space without pits or cells where oblong apertures 27 are provided through which the longer grain falls, such as barley and oats, which have not lodged in the cells, but have worked their way down through the inclined cylinder. At this point in the cylinder is secured a conical annular guide and shield 27, which receives and guides into the cylinder C at a point beyond the apertures 27 the grain or seeds carried along the trough 16 and prevents them from falling through the said apertures 27. The trough 16 is interrupted at the point where it passes through the guide 28, so that the grain may be discharged therefrom and flow into the section of the cylinder at the right in Fig. 1, and the conveyer 17 has a part of its spiral blade removed or omitted at this point also for a distance about equal to the length of the guide measured longitudinally. Thus the trough 16 discharges into the second section or part of the cylinder C, and as this part of the cylinder has relatively small cells or pits 8 the round grains or seeds only will lodge in the said cells, which carry them up free from wheat and short grains into the trough. The grains such as wheat roll to the lower part of the cylinder and finally fall out through apertures $27^a$ at the extreme lower end of the cylinder. On the other hand, the round grains or seeds carried into the trough and fed along the same by the conveyer fall out of the lower end of the trough onto an annular conical shield and chute $28^a$, which leads them out of the cylinder. They may be led down an incline 29 into any suitable receptacle.

The endless screw conveyer 17 is driven through the medium of gearing seen at the extreme right in Fig. 1. A toothed wheel 30, secured or fixed to a cross-bar 31 in the end of the cylinder C, gears with a pinion 32 on the axis of the shaft of the conveyer. Thus the cylinder drives the conveyer.

Grains which escape through the apertures $27^a$ fall into a conical screen 33, which has in it elongated or oblong rectangular apertures, such as are seen at $33^x$ in Fig. 17, which shows a part of such screen. This screen rotates with the cylinder C, and the apertures therein are of several different lengths, so as to sort out and separate still further certain grains, such as tares or rye mixed with the wheat, and also effect the classing of the sorted wheat into two grades or sizes. These different grains or grades of wheat may be caught in separate receptacles in a known way.

In the form of the apparatus seen in Fig. 4 there are two conical screens $33^a$ and $33^b$, of which the first receives the grain falling from the higher anterior section or part of the cylinder C and the latter receives that which falls from the other or lower section thereof. The first-named screen sorts and classes the longer grains, being analogous in function to the screen 33, (seen in Fig. 1;) but the apertures in it will be larger than those in the screen 33. The construction illustrated in Fig. 4 also shows how two regulating devices may be employed operable independently of each other, one for regulating or adjusting the chutes 21 in the first section of the cylinder and the other for regulating said chutes in the second section thereof. To effect this, the section of the trough 16 which is in the second section of the cylinder (see Figs. 12 and 13) is carried by a sleeve $9^a$, loose on the shaft 9, and the regulating-lever $23^a$ at this end is secured on this sleeve. The section of the endless screw conveyer in this section of the trough is driven through the medium of a toothed wheel $30^a$, rotative on said sleeve and driven by the cylinder, said wheel gearing with a pinion $32^a$ on the shaft of the conveyer. The object of this construction is to permit the conveyer to be driven at different speeds in the different sections of the cylinder.

In Fig. 6 is illustrated a form of the apparatus where the cylinder is divided transversely into two parts and the frame F also for convenience of transportation. In this view the two separated parts of the cylinder are designated $C'$ and $C^2$, and when the apparatus is set up the two sections of the shaft 9 are connected by a coupling 34. The annular shield and guide $28^b$, onto which the grains and seeds fall from the trough, has in it pockets $28^c$, which carry them up and dump them into a chute 35, which leads and delivers them into the next or second section of the cylinder.

An important feature of this invention is the automatic bagging device for bagging the assorted grain, and this device will now be described with especial reference to Figs. 4, 5, 15, and 16.

As shown in Fig. 4, the outer conical screen $33^b$ has at its delivery end an annular cylindrical chambered drum 36. This drum is closed at one end; but in its periphery are apertures 37, and at its receiving end are apertures 38 for the grain to enter the chamber from the screen. A belt 39 encircles the lower part of the pulley-like chambered drum 36 and extends over a smaller pulley 40 on the frame above, and this belt 39 carries a plurality of peculiarly formed or constructed cups 41, as best seen in detail in Figs. 15 and 16. In the belt 39, where the cup is secured thereto, is an aperture $39^a$, through which the grain in the chamber of the drum may flow by gravity into the cup through the apertures 37, brought into register with those in the belt. The cup 41 is or may be of an elongated irregular hexagonal form, attached by its apertured face to the belt and having a discharge-opening $41^a$ at an opposite face.

In the cup is a flap or valve $41^b$ to close the aperture $41^a$, and this flap is hinged at $41^c$. As the cup moves downward, Fig. 5, under the drum 36 the flap $41^b$ falls by gravity into position to close the discharge-aperture $41^a$, and the cup is then charged with grain. As the cup rises on the other side the grain shifts therein to its lower end and allows the flap $41^c$ to fall away, so that when it passes over the top of the pulley 40 (the position seen in Fig. 15) the outlet-aperture $41^a$ will be open, so that in turning to descend again the charge of grain will fall therefrom into the sack or bag S. The belt may be tightened by shifting the journals of the pulley 40 into higher bearing-notches in supports 42, one of which is seen in dotted lines in Fig. 5. Any of the various known means for putting the proper tension on the belt may be employed.

Another important feature of the invention consists in providing brushes to bear on the outer surfaces of the screens 33 $33^a$ $33^b$. This feature is illustrated on a small scale in end elevation in Fig. 18 and in plan in Fig. 19. In these views, 43 designates the brush, which extends lengthwise of the screen and is hinged to the frame at 44. A suitable pressure of the brush on the screen is attained by means of a chain or flexible connector 45, which is connected at one end, through a spring $45^a$, to the brush and attached removably to a hook or pin in the frame at 46. Thus the pressure of the brush on the screen may be regulated. The object of the brush is to disengage any grains that may stick fast in the apertures.

By the word "brush," as herein used, is meant any suitable device for brushing loose or disengaging the grains. Its particular form is not very important to this invention. These brushing devices being hinged and held down elastically by the chains, it will be obvious that by disengaging the chains from the hook or pin 46 in the frame they may be thrown back out of contact with the cylinder.

Having thus described my invention, I claim—

1. An apparatus for the purpose specified, having an inclined cylinder provided with cells 8 in its inner surface, those in the different sections of the cylinder differing in capacity, means for rotating said cylinder, a shaking-screen over which the grain passes on its way into the higher end of the cylinder the latter having outlet-apertures disposed at the ends of its sections or parts, annular conical shields in the cylinder at the points where said outlet-apertures are situated, a trough extending through the cylinder, a screw conveyer rotatable in said trough, means for driving said conveyer, said trough having an outlet-aperture where it passes through the first annular shield, means for leading the grains which are carried up by and fall from the cells, into said trough, and a conical screen about the cylinder and carried thereby, to receive the grain which falls through the outlet-apertures therein, said screen having in it oblong apertures of different sizes for sorting the grain.

2. An apparatus for the purpose specified, having an inclined cylinder provided interiorly, with cells, those in the first section or portion of the cylinder being larger than those in the second or terminal portion thereof, said cylinder being provided at the delivery end of the first section thereof with outlet-apertures 27, and at the delivery end of the second section thereof with outlet-apertures $27^a$, a shaking-screen over which the grain flows into the receiving end of the cylinder, the shaft on which the cylinder rotates, extending axially through the latter, a trough extending through the cylinder below said shaft and suspended from the latter, a screw conveyer rotative in said trough, means for rotating the cylinder, means between the cylinder and conveyer for driving the latter, an annular, conical shield and guide 28, disposed so as to shield the apertures 27, an annular, conical shield and guide $28^a$, disposed to shield the apertures $27^a$, and a conical screen 33, about and carried with the cylinder, said screen having in it oblong apertures of different lengths, in series, said screen being so disposed as to receive the grain falling through the apertures $27^a$.

3. An apparatus for the purpose specified, having an inclined cylinder, having cells in its interior surface, said cylinder being divided into two longitudinal connected parts or sections, the cells in the first section being larger than those in the second section, a shaft about which said cylinder turns axially, means for driving the cylinder, a hopper, a shaking-screen which receives the grain from the hopper and delivers it to the cylinder, a trough under the shaft of the cylinder and fixed thereto, a screw conveyer which rotates in the trough, a conical annular shield disposed between outlet-apertures in the cylinder at the end of its first section and an outlet-aperture in the trough, a conical annular shield disposed between outlet-apertures in the cylinder at the end of its second section and the delivery end of the trough, an inclined lateral chute carried with the trough and extending out to the wall of the cylinder, and means whereby the free edge of the said chute may be raised or lowered in the cylinder by turning the shaft of the cylinder about its axis.

4. In an apparatus for the purpose specified, the combination with the rotating inclined cylinder, having cells in its inner surface and outlets at proper points through its walls for the grain, and shields to shield said outlets, of frames secured to and pendent from said cylinder-shaft, a trough secured to said frames and extending through the cylinder, a screw conveyer rotatable in the trough and having bearings in the frames, a gear-wheel rotative on the cylinder-shaft and made rotatable with the cylinder, a pinion on the journal of the conveyer and gearing with said wheel, an inclined lateral chute 21 carried with the trough and extending out to the cylinder to guide the grain carried up by the cells into the trough, and means for turning the shaft of the cylinder about its axis for raising or lowering the free edge of said chute, said means comprising a lever 23 secured to the shaft and provided with a curved slot 25, and a bolt and nut for clamping fast said lever when the adjustment is effected.

5. In an apparatus for the purpose specified, the combination with the inclined rotating cylinder, in two sections, provided with cells 8 of different sizes in the two sections, and with two sets of outlet-apertures, 27 and $27^a$ at the delivery ends of the respective sections, the two conical shields, 28 and $28^a$, in said cylinder, and the shaft 9 on which the cylinder rotates, of the sleeve $9^a$ on said shaft, the frames 19 on said shaft and sleeve, the spouts mounted on said frames in the respective sections of the cylinder, the screw conveyers mounted in the respective troughs, means for driving said conveyers independently from the rotating cylinder, lateral inclined chutes carried with the troughs and extending from the latter out to the inner surface of the cylinder, means for turning said shaft about its axis for adjusting the chute of one trough, and means for turning said sleeve about its axis for adjusting the chute of the other trough.

6. In an apparatus for the purpose specified, the combination with the means for separating the grains, having a rotating cylinder and a conical screen into which the grain flows, of the chambered drum 36 into which the grain flows from the screen, said drum having in it peripheral apertures 37, a pulley 40 above the drum, a belt 39 about said drum and pulley, said belt having in it apertures $39^a$, and cups 41, mounted on said belt over said apertures, each cup having an outlet $41^a$, and a hinged flap $41^b$ to close said aperture when the cup is receiving its charge.

7. In an apparatus for the purpose specified, the combination with the cylinder, means for rotating it, means within the cylinder for sorting the grain, and a conical screen rotatable with the cylinder and receiving grain therefrom, of means for disengaging the grain from the apertures in the cylinder, said means comprising a brush hinged on the frame of the apparatus and resting on the cylinder, a chain, a spring connecting the chain with the brush, and a pin in the frame on which the chain is detachably secured.

In witness whereof I have hereunto signed my name, this 28th day of September, 1904, in the presence of two subscribing witnesses.

HILAIRE EMILE MAROT.

Witnesses:
HENRY CONNETT,
MARCEL ARMENGAUD.